UNITED STATES PATENT OFFICE.

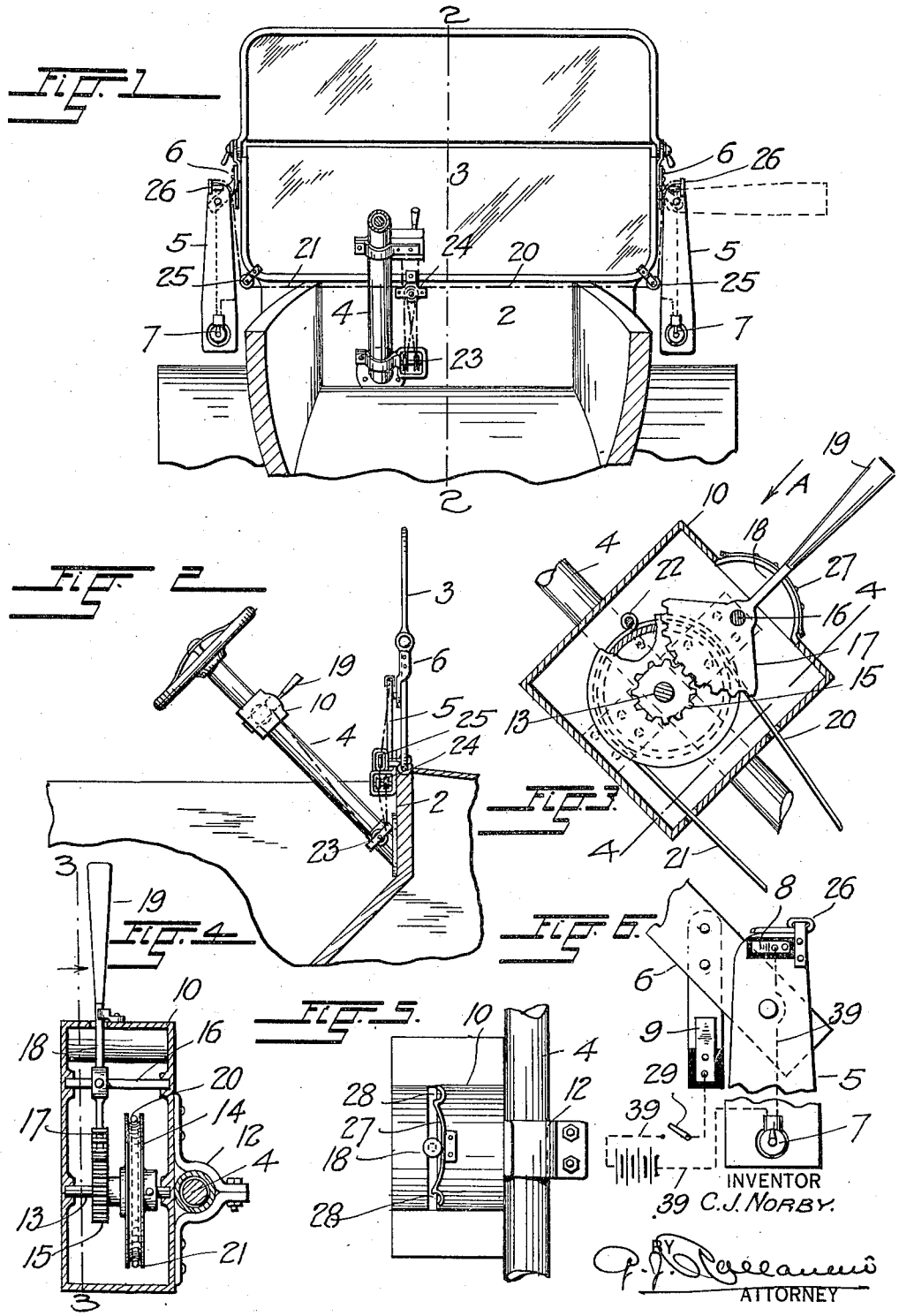

CLARENCE J. NORBY, OF HENDERSON, COLORADO.

SIGNAL-OPERATING MECHANISM.

1,320,339.	Specification of Letters Patent.	Patented Oct. 28, 1919.

Application filed August 27, 1917.  Serial No. 188,465.

*To all whom it may concern:*

Be it known that I, CLARENCE J. NORBY, a citizen of the United States, residing at Henderson, in the county of Adams and State of Colorado, have invented certain new and useful Improvements in Signal-Operating Mechanism, of which the following is a specification.

My invention relates to direction indicating signals for motor-driven vehicles, and its primary object is to provide a simple mechanism for the separate projection of a pair of semaphore arms pivotally connected at opposite sides of the windshield of a motor vehicle.

Another object of the invention resides in providing simple means for the attachment of the arms and operating mechanism of the appliance, and still another object is to provide electrically circuit-breaking devices to automatically complete the circuits of electric lamps mounted on the semaphore arms, when said arms are moved to their projecting positions.

With the above and other objects in view, all of which will fully appear in the course of the following description, my invention consists in the arrangement of parts and combinations of devices shown in the accompanying drawings in the various views of which like parts are similarly designated, and in which—

Figure 1 is a face view of the dash and windshield of a motor driven vehicle showing my invention in its operative position, Fig. 2, a section taken along the line 2—2, Fig. 1, Fig. 3, an enlarged sectional view of the mechanism of the invention by which the semaphore blades are operated, looking in the direction of the arrow drawn across the line 3—3, in Fig. 4, Fig. 4, a section taken along the line 4—4, Fig. 3, Fig. 5, a plan view of the casing in which said mechanism is inclosed, looking in the direction of the arrow A, Fig. 3, and Fig. 6, a fragmentary elevation of one of the semaphore blades and the bracket by which it is connected to the windshield of the vehicle, showing the parts of the respective circuit breaking device in their coöperative relation.

Referring more specifically to the drawings, 2 designates the dash, 3 the windshield, and 4 the tubular steering post of a motor driven vehicle.

My invention comprises two elongate semaphore blades 5 pivoted at one of their ends to brackets 6 which are adapted to be secured at opposite sides of a wind-shield of conventional construction by the same bolts which connect the two halves thereof.

The blades carry at their outer ends, small incandescent lamps 7 to indicate their projecting position at night, and they are provided at their opposite ends with tongue shaped members 8 of electric circuit breakers, the correlative socket members 9 of which are secured to their respective brackets as best shown in Fig. 6.

The lamps are connected in an electric circuit 39 which when the signal blades are in a vertical position, is broken in the respective circuit breakers and which is completed when by movement of the blades to a horizontal position the correlative parts of the circuit breakers are placed in contact with each other.

The mechanism by which the blades may be moved separately from a vertical to a horizontal position, consists of a casing 10 provided with a clamping device 12 of suitable construction to rigidly secure it to the steering-post as shown in Figs. 1 and 2.

An arbor 13 rotatably mounted in the casing, carries a peripherally grooved wheel 14 and a pinion 15, and a second arbor 16 parallel to the other, is provided for the rotation of a toothed segment 17 at the end of the short arm of a lever 18 the opposite arm of which projects through a slot in the top of the casing to provide a handle 19 by which the mechanism is operated.

Ropes 20 and 21 secured to the wheel as at 22, lie in the peripheral groove thereof and passing partially around the wheel in opposite directions, extend through apertures in a side of the casing for their connection with the semaphore blades.

A pair of sheaves 23 mounted on the steering post, a second pair of sheaves 24 mounted on the dash of the vehicle, and two pulleys 25 rotatably secured at the lower corners of the windshield, serve to guide the ropes in the movement imparted thereto by rotation of the wheel 14.

The semaphore blades are extended beyond their pivotal axes to provide lever arms to which the ropes are attached as at 26, for the purpose of moving the blades from a vertical to a horizontal position.

This result is accomplished by movement of the handle 19 which through the instrumentality of the segment 17 and the therewith meshing pinion 15 causes the wheel 14 to rotate through a determinate arc.

When by the movement of the handle, the wheel 14 is rotated in either direction, one of the ropes is wound in its peripheral groove and in consequence moves the semaphore arm to which its end is attached, to the projecting position in which it is held by a spring-catch mounted on the top of the casing.

This spring-catch consists of a laterally resilient curved blade 27 provided adjacent its ends with semi-circular notches 28 adapted to receive the handle in its adjusted positions.

The blade 27 is in constant frictional contact with the lever 18 as best shown in Fig. 5, so that the handle 19 will spring automatically into the notches 28 when it reaches the ends of its movement about the axis of its arbor and will move out of the same without manual adjustment when it is returned to its normal position.

It will be seen that by these means, either signal blade may be moved to a projecting position independent of the other and that when the lever is released from the notch of the resilient catch, the projecting arm will by its own weight, fall to its normal vertical position.

When either blade assumes the horizontal position, the members of the respective circuit-breaker are brought into contact with each other, with the result that the circuit of the respective lamp is completed, a switch 29 in the lamp-circuit being as usual provided to prevent the incandescence of the lamp when the signaling appliance is used in day time.

Having thus described the construction and arrangement of the coöperative parts of my improved signaling appliance, it will be seen that I have provided a system of very simple devices which can be produced and maintained at very little cost, which may be applied to any motor vehicle of modern construction without the use of special tools, or the aid of expert mechanics, and which effectively indicates to pedestrians and drivers of approaching or following vehicles, in what direction the vehicle to which the invention is applied, is about to turn.

Having thus described my invention what I claim and desire to secure by Letters-Patent is:

1. In a system of the character described, two semaphore arms, a pulley and a continuous flexible member, which are connected for moving the arms selectively from a retracted position to a projecting position by rotary movements of the pulley in opposite directions, a lever occupying a neutral position when both arms are in a retracted position, and means for transmitting the lever-movement to the pulley whereby to move one of the semaphore arms to its projecting position, by a determinate movement of the lever in one direction, and to move the other arm to its projecting position, by a determinate movement of the lever in the opposite direction.

2. In a system of the character described, two semaphore-arms, a pulley and a continuous flexible member, which are connected for moving the arms selectively from a retracted position to a projecting position by rotary movements of the pulley in opposite directions, a lever occupying a neutral position when both arms are in a retracted position, means for transmitting the lever-movement to the pulley whereby to move one of the semaphore arms to its projecting position by a determinate movement of the lever in one direction, and to move the other arm to its projecting position by a determinate movement of the lever in the opposite direction, and means to automatically retain the lever in its adjusted positions.

In testimony whereof I have affixed my signature in presence of two witnesses.

CLARENCE J. NORBY.

Witnesses:
CLARA P. GLANTZ,
HANS NORBY.

Copies of this patent may be obtained for five cents each, by addressing the "Commissioner of Patents, Washington, D. C."